United States Patent
Lee et al.

(10) Patent No.: US 6,751,461 B1
(45) Date of Patent: Jun. 15, 2004

(54) APPARATUS AND METHOD FOR OPERATING A COMMUNICATION UNIT USING A DEFAULT CHANNEL

(75) Inventors: Chong Meng Lee, Kedah (MY); Kean Seong Hooi, Penang (MY); Ah Kow Mah, Penang (MY)

(73) Assignee: Motorola, Inc., Schaumburg, IL (US)

( * ) Notice: Subject to any disclaimer, the term of this patent is extended or adjusted under 35 U.S.C. 154(b) by 563 days.

(21) Appl. No.: 09/717,177

(22) Filed: Nov. 20, 2000

(51) Int. Cl.$^7$ ................................................. H04Q 7/20
(52) U.S. Cl. ...................... 455/450; 455/560; 455/447; 455/452.1; 455/452.2; 370/337; 370/321; 370/442
(58) Field of Search ................................. 455/560, 450, 455/447, 452.1, 452.2, 464; 370/347, 337, 321, 442

(56) References Cited

U.S. PATENT DOCUMENTS

| | | | |
|---|---|---|---|
| 5,418,839 A | * | 5/1995 | Knuth et al. |
| 5,799,241 A | | 8/1998 | Matsubara et al. |
| 5,898,928 A | * | 4/1999 | Karlsson et al. |
| 5,940,746 A | * | 8/1999 | Otting et al. |
| 5,995,500 A | * | 11/1999 | Ma et al. |
| 6,215,982 B1 | * | 4/2001 | Trompower |
| 6,278,881 B1 | * | 8/2001 | Balck |

* cited by examiner

*Primary Examiner*—Sinh Tran
*Assistant Examiner*—Huy Nguyen

(57) ABSTRACT

A method (30) for operating a communication unit on a default channel that is selected from a plurality of communication channels is disclosed. The method (30) includes providing (34) communication on a default channel. The method further includes temporarily switching (36) to a selected second channel for communication and monitoring (38) communication activity on the selected second channel. The method (30) also includes reverting (40) automatically to the default channel when communication activity is undetected for a predetermined time period. An apparatus (2) embodying the above method (30) is also disclosed.

8 Claims, 2 Drawing Sheets

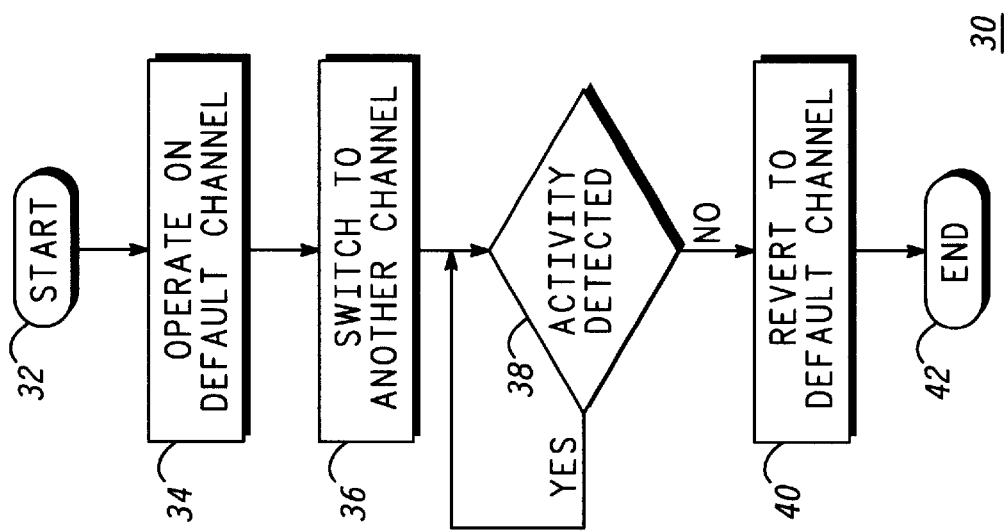

APPARATUS AND METHOD FOR OPERATING A COMMUNICATION UNIT USING A DEFAULT CHANNEL

FIELD OF THE INVENTION

This invention relates, in general, to an apparatus and a method of operating a two-way radio, and more particularly, to an apparatus and a method for operating a two-way radio on a default channel and allowing temporary operation on a different channel.

BACKGROUND ART

Conventional two-way radios or communication units have many channels of operation with some units having as many as 128 channels. A user of such a communication unit normally operates on a designated first channel to communicate with other users operating on the same channel. However, there may be times when the user wishes to communicate with units operating on a second channel different from the first channel. To do this, the user operates a channel selector on his unit to manually select the second channel for operation. Once communication on the second channel is completed, the user will have to remember to switch his unit back to operate on the designated first channel; otherwise the user will not be able to receive transmissions from other units operating on the designated first channel. It is a burden to the user to have to constantly remember to switch his unit back to the first channel.

There are more sophisticated communication units that can operate in a scan mode such as those disclosed in U.S. Pat. Nos. 5,799,241 and 5,940,746. In the scan mode, a unit cyclically monitors a group of channels for any transmission from other units. Once transmission is detected on an active channel, the unit locks onto the active channel to allow communication on the channel. Once communication on the active channel is completed, the unit will return to the scan mode. This scan mode therefore allows the communication unit to be triggered to operate on an active channel. If no channels are active, the user can only transmit on a default channel that is selected on the communication unit. If the user wishes to transmit on a second channel different from the default channel, the user would have to exit the scan mode and switch to this second channel for operation on the second channel. As in the less sophisticated unit without a scan mode, if the user upon completion of communication on the second channel forgets to switch the unit back to the default channel and to reactivate the scan mode, the unit would remain operational only on the second channel. This poses an even bigger problem to the user because the user would not just lose communication with units on the default channel but all units on the scanned channels other than those operating on the second channel.

SUMMARY OF THE INVENTION

According to one aspect of the invention there is provided a method for operating a communication unit on a default channel selectable from a plurality of communication channels. Said method includes providing communication on said default channel. Said method further includes temporarily switching to a selected second channel for communication and monitoring communication activity on said selected second channel. Said method also includes reverting automatically to said default channel when communication activity is undetected for a predetermined time period.

Suitably, said communication unit may be operable in a scan mode wherein said method further includes deactivating said scan mode prior to temporarily switching to said selected second channel and re-activating said scan mode when reverting to said default channel.

Suitably, providing communication on said default channel may include selecting one of said plurality of communication channels while said communication unit is in a power off state and setting said selected channel as said default channel upon powering up of said communication unit.

Preferably, providing communication on said default channel should include selecting one of said plurality of communication channels and actuating an input means for setting said selected channel as said default channel.

Preferably, said method may further include providing a first visual indicator for indicating operation of said communication unit in said default channel.

Preferably, said method may further include providing a second visual indicator for indicating operation of said communication unit in said selected second channel.

Suitably, said first and second visual indicators may be provided simultaneously.

Preferably, said first visual indicator should be a solidly on LED and said second visual indicator should be a blinking LED.

According to another aspect of the invention there is provided a program storage device readable by a processor, tangibly embodying a program of instructions, executable by said processor to perform a method for operating a communication unit on a default channel selectable from a plurality of communication channels as described above.

According to yet another aspect of the invention there is provided a communication unit operable in a plurality of communication channels. Said communication unit includes a channel selector, a transceiver and a memory operatively coupled to a processor. Said processor executes program instructions in said memory to allow communication on a default channel and to further allow temporary communication on a second channel selected by said channel selector. Said processor further monitors communication activity on said selected second channel and reverts automatically to said default channel when communication activity is undetected for a predetermined time period.

BRIEF DESCRIPTION OF THE DRAWINGS

In order that the invention may be readily understood and put into practical effect, reference will now be made to a preferred embodiment as illustrated with reference to the accompanying drawings in which:

FIG. 2 is a flow diagram describing a sequence of steps for operating the communication unit in FIG. 1 on a default channel and for temporarily operating the communication unit on a selected channel different than the default channel.

DETAILED DESCRIPTION OF THE PREFERRED EMBODIMENT

Figure 1:
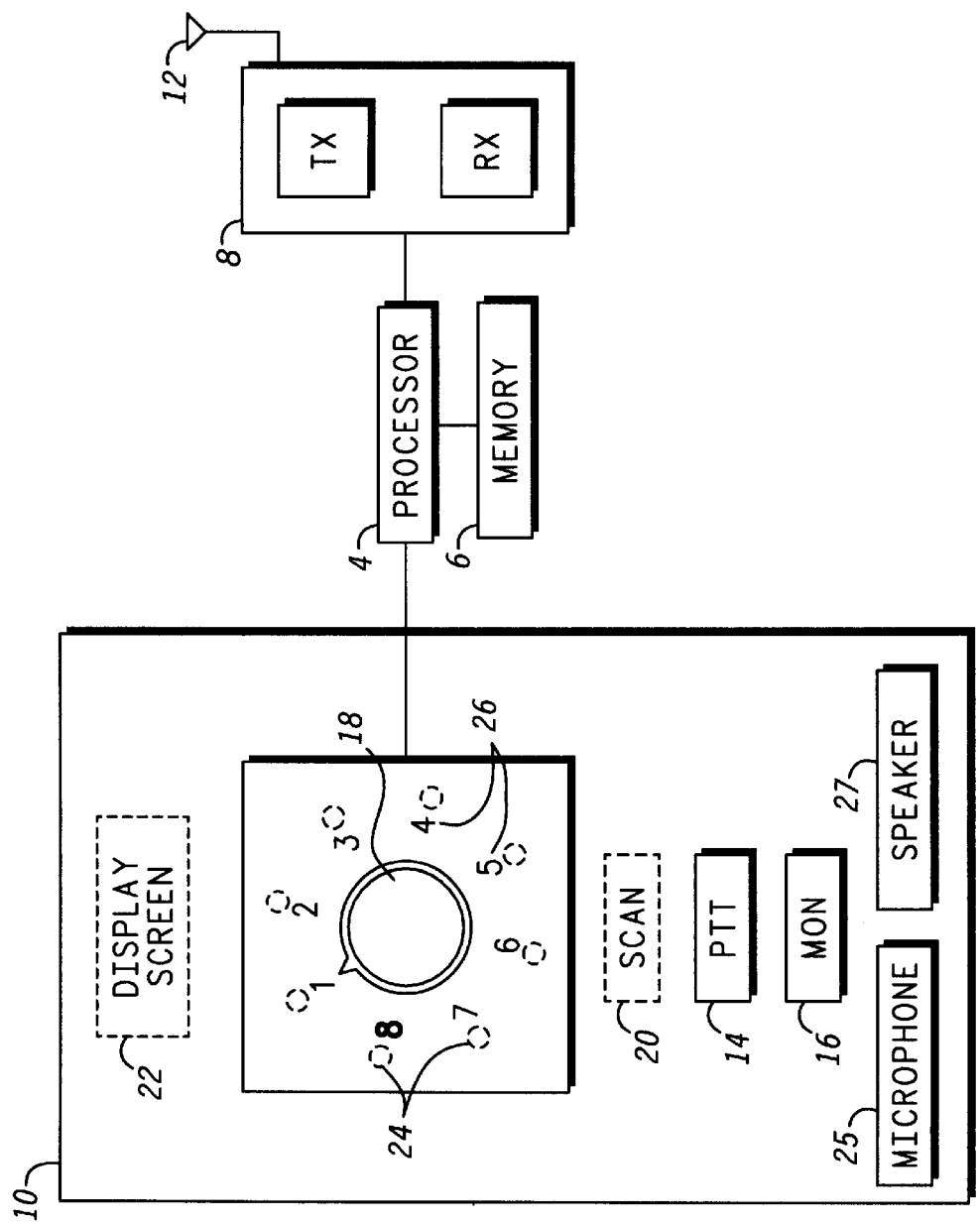
FIG. 1 is a block diagram of components of a communication unit according to the present invention.

FIG. 1 is a block diagram of components of a communication unit 2. The communication unit 2 includes a memory 6, a transceiver 8 and a user interface 10, all of which are operatively coupled to a processor 4 as is well known to those skilled in the art. The processor 4 operates the communication unit 2 by executing program instructions readable from the memory 6. The processor 4 controls the transceiver 8 for operating the communication unit 2 on a particular channel selectable through the user interface 10. The communication unit further includes an antenna 12 coupled to the transceiver 8 for transmitting and receiving radio frequency (RF) signals.

The user interface 10 includes a press-to-talk (PTT) button 14, a monitor (MON) button 16 and a channel selector 18. The user interface 10 optionally includes a scan button 20 and visual indicators such as a display screen 22 or light emitting diodes (LEDs) 24. The communication unit 2 operates in a default receive mode and switches to operate in a transmit mode when the PTT button 14 is actuated.

In the transmit mode, a microphone 25 of the user interface 10 receives voice that is converted to electrical audio signals and subsequently modulated by the transceiver 8 into electrical RF signals. The antenna 12 emits the electrical RF signals as RF signals.

In the receive mode, RF signals are received via the antenna 12 as electrical RF signals. The transceiver 8 demodulates the electrical RF signals into electrical audio signals. A speaker 27 of the user interface 10 converts the electrical audio signals to audible signals.

The MON button 16 allows the volume of the speaker to be adjusted. The channel selector 18 is typically a rotary switch as shown in FIG. 1. Or in one alternative form, it may be a keypad. In the absence of a display screen 22, numerical channel markings 26 on the unit 2 indicate a selected channel.

FIG. 2 is a flow diagram describing a sequence 30 of steps for operating the communication unit 2 on a default channel and for temporarily operating the communication unit 2 on a selected channel different than the default channel. The communication unit 2 is operable on a plurality of channels that are selectable by channel selector 18. The sequence 30 is first described with reference to the communication unit 2. The sequence 30 begins in a START step 32 and proceeds to an OPERATE ON DEFAULT CHANNEL step 34. In step 34, a user selects a channel by turning the channel selector 18 to the selected channel and then powers the unit 2 up in that selected channel. These actions by the user allow the selected channel to be set as a default channel for operation. The unit 2 is then operable to communicate with other units operating only on the default channel unless the unit 2 is switched to operate on a different channel.

If the unit 2 is to be used for temporary communication with other units that usually operate on a different channel than the default channel, the sequence 30 proceeds to a SWITCH TO ANOTHER CHANNEL step 36. Step 36 is effected by the user turning the channel selector 18 to select another channel, for example Channel-7 which is hereafter referred to as a second channel. While switched to this second channel, the unit 2 is no longer able to communicate with units on the default channel.

As soon as the second channel is selected, ACTIVITY DETECTED step 38 is effected, where the second channel is monitored for any communication activity. If it is determined by the ACTIVITY DETECTED step 38 that there is communication activity, the unit 2 continues to operate on the second channel. However, if it is determined that there is no communication activity for a predetermined period, for example seven seconds, the unit 2 reverts, preferably automatically, to operate on the default channel in a REVERT TO DEFAULT CHANNEL step 40. Alternatively, an audio reminder may be produced, preferably intermittently, until the user returns the unit 2 to the default channel by turning the channel selector 18 to the default channel position. Finally, the sequence 30 proceeds to an END step 42.

When automatically returning the unit 2 to the default channel, the rotary switch 18 remains in the Channel-7 position. Therefore, without any means of indicating which channel the unit 2 is operating on, it is important that the user correctly sets and remembers the default channel. Also, in order to operate in the earlier selected Channel-7 after the unit 2 has been returned to the default channel, the user may have to turn the rotary switch 18 away from and back to the Channel-7 position to re-select the channel.

With a keypad as a channel selector 18, there wouldn't be any issue associated with a wrong indication of channel of operation as described above.

Preferably, a no-activity timer that can be implemented either in hardware or software may be used to track the period of no activity on the selected second channel. The timer is started when the unit 2 is switched to operate on the second channel and is reset whenever there is communication activity on that channel.

The communication unit 2 may be provided with LEDs 24 disposed on the unit 2 to correspond to the numerical channel markings 26. One of the LEDs 24 that corresponds to the default channel may be turned solidly on. When the unit 2 is switched to the second channel, the default channel LED 24 may be turned off and the Channel-7 LED may be turned solidly on instead. Alternatively, the default channel LED 24 may remain solidly on and the Channel-7 LED may be blinked to indicate that operation on that channel is temporary.

A unit 2 without a display screen may operate without a default channel by powering the unit 2 up with the rotary switch 18 turned to a predetermined channel, for example Channel-8, which for that purpose may be marked differently from the rest of the channels.

The communication unit 2 can also be provided with a display screen 22. With such a display screen 22, the numerical channel markings 26 described earlier are redundant. An indicium, such as a number or frequency, corresponding to a selected channel can be displayed on the screen 22 instead.

The OPERATE ON DEFAULT CHANNEL step 34 is different from that on a unit 2 without a display screen 22. In a power off state, the display screen 22 is blank and there is no way of knowing which channel was previously selected before power off. Therefore the power up setting of a default channel used in the non-display unit 2 cannot be implemented on one with a display screen 22. A more appropriate way to implement the OPERATE ON DEFAULT CHANNEL step 34 may be to allow a default channel to be set after powering up. Such setting of a default channel may involve actuating an input means such as a button in the user interface 10 to effect the setting of the default channel. Actuating a button may be implemented by actuating an already existing button 14, 16 for a longer period or simply by the normal actuating of a dedicated button (not shown).

To operate the unit 2 on the second channel, a user simply turns the rotary switch 18 until a Channel-7 indicium appears on the screen 22. This action will cause the unit 2 to switch to the second channel in the SWITCH TO ANOTHER CHANNEL step 36. The indicium may be caused to blink to indicate that the second channel is only temporarily selected. The ACTIVITY DETECTED step 36 and REVERT TO DEFAULT CHANNEL step 38 may be implemented in a similar manner as previously described for a unit 2 without a display screen 22. As the unit 2 is returned to operate on the default channel, a default channel indicium will replace the Channel-7 indicium on the display screen 22. A separate indicium on the display screen 22 may be used to indicate whether a default channel has been set and if the unit is operating on that default channel.

Any of the communication units 2 described above may be equipped with a scan mode. In such a unit 2, the scan button 20 is actuated to toggle a scan mode between an activated and a deactivated state. In implementing the SWITCH TO ANOTHER CHANNEL step 36 when the scan mode is activated, the unit 2 will have to additionally deactivate the scan mode if the scan mode is activated. Also when returning to the default channel in the REVERT TO DEFAULT CHANNEL step 40, the unit 2 will have to additionally reactivate the scan mode if the scan mode was activated prior to entering the SWITCH TO ANOTHER CHANNEL step 36.

Advantageously, the sequence 30 ensures that the communication unit 2 is automatically reverted to operate on the default channel without the need for any user intervention. Communication with other units on the default channel and other scanned channels will not be lost because a user forgets to manually return the unit to the default channel after switching to another channel.

Although the invention has been described with reference to the preferred embodiment, it is to be understood that the invention is not restricted to the embodiment described herein. For example, OPERATE ON DEFAULT CHANNEL step 34 on a non-display unit 2 may be implemented in a similar manner as that described above for a unit 2 with a display screen 22.

What is claimed is:

1. A method for operating a communication unit on a default channel selectable from a plurality of communication channels, said method comprising:

providing communication on said default channel;

temporarily switching communication to a selected second channel;

monitoring communication activity on said selected second channel; and reverting automatically to said default channel when communication activity is undetected for a predetermined time period, wherein said communication unit is operable in a scan mode, and said method further comprises deactivating said scan mode prior to temporarily switching to said selected second channel and re-activating said scan mode when reverting to said default channel.

2. A method according to claim 1, wherein providing communication on said default channel includes:

selecting one of said plurality of communication channels while said communication unit is in a power off state; and setting said selected channel as said default channel upon powering up of said communication unit.

3. A method according to claim 1, wherein providing communication on said default channel includes:

selecting one of said plurality of communication channels; and actuating an input means for setting said selected channel as said default channel.

4. A method according to claim 1, further comprising:

providing a first visual indicator for indicating operation of said communication unit on said default channel.

5. A method according to claim 4, further comprising:

providing a second visual indicator for indicating operation of said communication unit on said selected second channel.

6. A method according to claim 5, wherein said first and second visual indicators are provided simultaneously.

7. A method according to claim 6, wherein said first visual indicator is a solidly on LED and said second visual indicator is a blinking LED.

8. A communication unit comprising:

a processor;

a channel selector operatively coupled to said processor;

a transceiver operatively coupled to said processor; and a memory operatively coupled to said processor;

wherein in use said processor executes program instructions in said memory to allow communication on a default channel and to further allow temporary communication on a second channel selected by said channel selector, and said processor further monitors communication activity on said selected second channel and reverts automatically to said default channel when communication activity is undetected for a predetermined time period wherein said communication unit is operable in a scan mode and provides for deactivating said scan mode prior to said temporary communication on said second channel and re-activating said scan mode when reverting to said default channel.

* * * * *